Feb. 1, 1966  L. F. BLATT  3,232,181
DIFFERENTIAL AREA GAS CYLINDER
Filed July 24, 1964
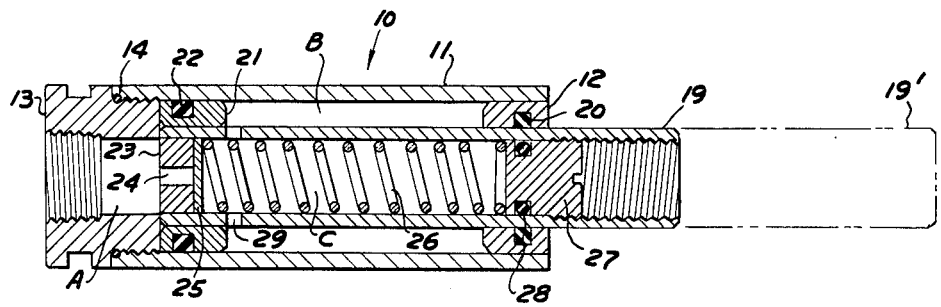
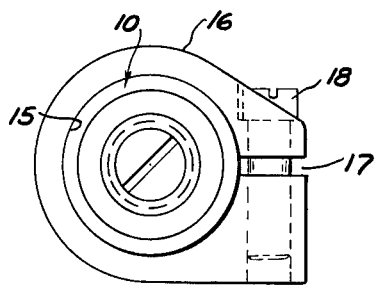
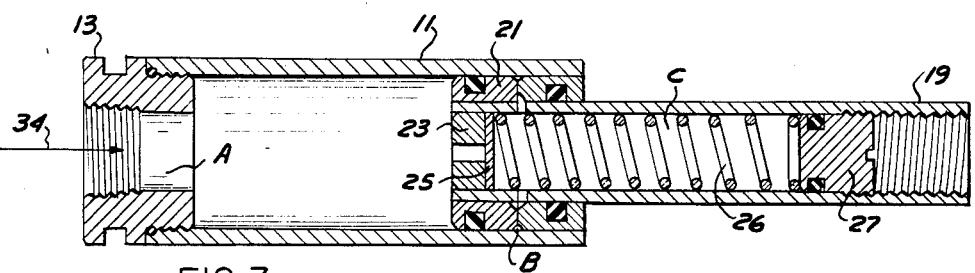
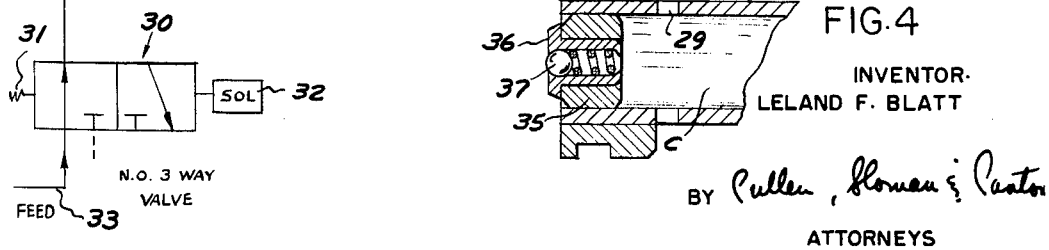
INVENTOR·
LELAND F. BLATT
BY Cullen, Sloman & Cantor
ATTORNEYS

United States Patent Office

3,232,181
Patented Feb. 1, 1966

3,232,181
DIFFERENTIAL AREA GAS CYLINDER
Leland F. Blatt, Grosse Pointe Woods, Mich.
(24121 Mound Road, Warren, Mich.)
Filed July 24, 1964, Ser. No. 384,854
1 Claim. (Cl. 91—422)

The present invention relates to a differential area gas cylinder and more particularly to a cylinder assembly including a piston which is alternately pressurized and depressurized from the blind end thereof for effecting alternate reciprocal movements of the piston rod.

It is an object of the present invention to provide a novel differential area gas cylinder adapted for use in conjunction with machine tools and related devices for effecting controlling movements or for actuating a device or for serving as an adjustable stop or the like and wherein the cylinder and piston rod assembly is constructed to provide a series of pressurized control chambers for regulating reciprocal movements of the piston assembly.

It is another object to provide a novel form of differential area gas cylinder by which the blind end only of the cylinder is pressurized for effecting movement in one direction of the piston assembly and upon depressurizing thereof the piston assembly automatically returns to its initial position.

These and other objects will be seen from the following specification and claim in conjunction with the appended drawing in which:

FIG. 1 is a longitudinal section of the present differential area gas cylinder with the piston assembly in operative position.

FIG. 2 is an end elevational view thereof within a suitable mounting.

FIG. 3 is similar to FIG. 1 with the piston assembly in extended position and with a controlled source of gas pressure shown schematically.

FIG. 4 is a fragmentary section corresponding to the piston assembly of FIG. 1 but with a different form of valve.

It will be understood that the above drawing illustrates merely a preferred embodiment of the invention, and that other embodiments are contemplated within the scope of the claim hereafter set forth.

Referring to the drawing, the present differential air gas cylinder, generally indicated at 10, includes a cylinder body 11 having at one end an apertured rod end head 12 and at its other end an apertured blind end head 13 threaded into said body and sealed at 14.

The differential area gas cylinder is adapted for mounting within a suitable support, such as the base of a machine tool, or within a suitable clamping device, such as shown in FIG. 2. In this illustration the differential area cylinder is nested within bore 15 of clamp 16 whose free end portions as at 17 are adjustably secured together by screw 18 for effectively securing said cylinder within the clamp.

The present cylinder includes a piston assembly within body 11 including the tubular rod 19, towards one end sealed at 20 within and movably extending through the rod end head 12, and at its other end mounting piston 21. Said piston is sealed at 22 and movable within the body 11, FIGS. 1 and 3.

The piston assembly includes valve seat 23 anchored at one end of the rod 19 and apertured at 24 to establish communication between chamber A within head 13 and chamber C within rod 19.

Chamber C is normally closed by a suitable valve 25. Said valve is shown in FIGS. 1 and 3 as a disc, loosely nested within the chamber C, and biased against the seat 23 by coiled spring 26. The latter is nested in compression within rod 19. The seating of the spring includes adjustable plug 27 adjustably threaded into the outer end portion of rod 19 and sealed therein at 28. Thus, the compression of the spring is variable, as required.

Chamber A is hereafter referred to as a first chamber, and chamber C as a second chamber. A third chamber B is also defined between body 11 and rod 19, and between piston 21 and head 12. Chamber B is gradually reduced in volume as piston 21 is moved to the extended position of FIG. 3, upon pressurizing of first chamber A. The extended position of piston rod 19 is indicated at 19', FIG. 1.

Apertures 29 are formed through the wall of rod 19 to establish communication between chambers B and C.

In the illustrative embodiment there is provided a normally open three-way valve 30 schematically shown in FIG. 3, which is maintained normally open by coil spring 31 connected to the movable valve spool. The valve is closed by activation of solenoid 32 when it is desired to depressurize chamber A.

The three-way valve is connected to a suitable source of gas under pressure as at 33, which gas may be compressed air for illustration. Conduit 34 interconnects the three-way valve 30 and apertured cylinder head 13. In operation, when pressure is provided to the normally open three-way valve, FIG. 3, first chamber A is pressurized. Chamber A progressively includes the adjacent bore of body 11 as piston 21 moves from the position shown in FIG. 1 to the extended position FIG. 3.

A slight variation of the valve construction is shown in FIG. 4. The seat 35 has mounted therein a conventional ball check valve 36 including spring-biased ball 37 to normally close off chamber C.

*Operation*

The three way valve 30 biased to normally open position by spring 31, is activated by solenoid 32 for depressurizing chamber A, and establishing atmospheric communication thereto. Valve 30 could be manually operated, double solenoid operated or pilot operated.

Three-way valve 30 supplies line gas pressure through conduit 34 to the single cylinder port or chamber A pressurizing the same.

Valve 25, which may be regarded as a "flutter" valve, is normally seated by compression spring 26 against apertured seat 23. On initial pressurizing of chamber A, FIG. 1, piston 21 moves towards the position shown in FIG. 3, with valve 25 normally seated and sealing off chamber C from chamber A.

At the end of the stroke of piston 21, FIG. 3, continued application of pressure unseats valve 25 pressurizing chamber C. Chamber B has been reduced from maximum volume in FIG. 1 to zero volume, FIG. 3.

At this point the piston assembly is now pressurized on both the rod end and the blind end and is maintained in the extended position shown, FIG. 3, by the pressure in chamber A acting upon the larger area of the blind end of the piston and working against the same pressure on the smaller area on the rod side of the piston.

By reversing the three-way valve, pressurized chamber A is open to exhaust and goes to zero or to atmospheric pressure. The flutter valve or like valve 25 is maintained in sealing position against seat 23 both by the gas pressure in chamber C acting on its area as well as by coil spring 26.

At this point the gas, such as air under pressure in chamber C expands through the piston rod orifices 29 to pressurize chamber B on the rod side of the piston. This forces the piston to retracted position, FIG. 1. In this connection the volumetric differential and pressure becomes less as the piston comes towards and to a rest position in accordance with Boyle's law of gas.

When chamber A is again pressurized, piston 21 will travel to the extended position; and then when chamber A is depressurized the said piston will automatically return.

The cylinder assembly 10 may be operated by a normally closed three-way valve rather than by the normally opened three-way valve shown in FIG. 3. In this case the piston 21 is maintained in retracted position once chambers B and C have received and maintained an initial pressure.

While a flutter or disc-like valve is shown in FIGS. 1 and 3, and a ball check valve shown in FIG. 4, any other type of check valve could be used for maintaining gas pressure in chambers B and C.

Having described my invention, reference should now be had to the following claim.

I claim:

A differential area gas cylinder comprising a cylinder body including apertured blind end and rod end heads;

the blind end head having a first chamber adapted for connection to a source of gas under pressure;

a piston assembly within said body including a tubular rod towards one end sealed within and movably extending through said rod end head, and at its other end mounting a piston sealed and movable within said body;

an apertured valve seat within said rod other end, defining a second chamber within said rod;

a movable valve in said chamber normally spring-biased against said seat, sealing said first and second chambers;

said rod and cylinder body defining a third chamber between said piston and rod end head;

said rod being apertured for communication between the second and third chambers;

pressurizing said first chamber causing movement of the piston assembly from the blind end to the rod end of the body; with successive pressurizing of the second chamber;

depressurizing said first chamber effecting concurrent pressurizing of said third chamber from the second chamber causing automatic return movement of the piston assembly, said valve being in the form of a disc loosely positioned with said rod; said bias being defined by a coiled spring in compression seated within said rod; the seating of said spring including an adjustable plug threaded and sealed within the outer end portion of said rod, the plug providing adjustment of the initial spring compression.

References Cited by the Examiner
UNITED STATES PATENTS 2,709,420  5/1955  Fullwood _____ 91—422 X
3,139,008  6/1964  Hannes _____ 91—422 X SAMUEL LEVINE, *Primary Examiner.*

UNITED STATES PATENT OFFICE
Certificate

Patent No. 3,232,181            Patented February 1, 1966

Leland F. Blatt

Application having been made by Leland F. Blatt, the inventor named in the patent above identified; and Paul R. Williams of Warren, Michigan, for the issuance of a certificate under the provisions of Title 35, Section 256 of the United States Code, adding the name of the said Paul R. Williams as a joint inventor, and a showing and proof of facts satisfying the requirements of the said section having been submitted, it is this 14th day of November 1967, certified that the name of the said Paul R. Williams is hereby added to the said patent as a joint inventor with the said Leland F. Blatt.

[SEAL]

EDWIN L. REYNOLDS,
*First Assistant Commissioner of Patents.*